(12) United States Patent
Lee et al.

(10) Patent No.: US 9,262,049 B2
(45) Date of Patent: Feb. 16, 2016

(54) APPARATUS AND METHOD OF PROVIDING GRAPHICAL USER INTERFACE

(75) Inventors: Ju-Hwan Lee, Yongin-si (KR); Jong-Ho Lea, Seongnam-si (KR); Sang-Wook Park, Yongin-si (KR); Yeun-Bae Kim, Seongnam-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 1079 days.

(21) Appl. No.: 12/218,062

(22) Filed: Jul. 11, 2008

(65) Prior Publication Data

US 2009/0049412 A1 Feb. 19, 2009

(30) Foreign Application Priority Data

Aug. 16, 2007 (KR) .................. 10-2007-0082400

(51) Int. Cl.
*G06F 3/048* (2013.01)
*G06F 3/0482* (2013.01)

(52) U.S. Cl.
CPC .................... *G06F 3/0482* (2013.01)

(58) Field of Classification Search
USPC ........................................... 715/836
See application file for complete search history.

(56) References Cited

U.S. PATENT DOCUMENTS

| 6,662,177 | B1 * | 12/2003 | Martino et al. ................ 1/1 |
| 6,976,228 | B2 | 12/2005 | Bernhardson ............. 715/830 |
| 7,543,245 | B2 | 6/2009 | Irimajiri |
| 7,590,948 | B2 * | 9/2009 | Narita et al. ................ 715/810 |
| 8,291,343 | B2 | 10/2012 | Kobayashi |
| 2003/0001898 | A1 * | 1/2003 | Bernhardson ............. 345/786 |
| 2003/0112279 | A1 * | 6/2003 | Irimajiri ..................... 345/810 |
| 2005/0091596 | A1 * | 4/2005 | Anthony et al. .......... 715/712 |
| 2005/0108657 | A1 * | 5/2005 | Han ............................ 715/827 |
| 2006/0288308 | A1 * | 12/2006 | Enomoto et al. .......... 715/811 |

FOREIGN PATENT DOCUMENTS

| JP | 2002-175139 | 6/2002 |
| JP | 2004-246712 | 9/2004 |
| JP | 2006-166435 | 6/2006 |
| JP | 2006-268295 | 10/2006 |
| JP | 2006-338177 | 12/2006 |

(Continued)

OTHER PUBLICATIONS

Korean Office Action issued Sep. 30, 2013 in corresponding Korean Patent Application No. 10-2007-0082400.
Korean Office Action mailed Apr. 3, 2014 in related Korean Application No. 10-2007-0082400.

(Continued)

*Primary Examiner* — William Trapanese
(74) *Attorney, Agent, or Firm* — Staas & Halsey LLP (57) ABSTRACT

The present invention relates to an apparatus and method of providing a graphical user interface, and, more particularly, to an apparatus and method of providing a graphical user interface that enables a user to rapidly search a desired menu.
An apparatus for providing graphical user interface according to an aspect of the invention includes an apparatus including an output unit outputting a first menu in which a plurality of menu items are arranged in a predetermined direction, and outputting a second menu having a first region and a second region that are classified from a menu item selected from the first menu according to a predetermined classification standard, and a control unit performing an operation that corresponds to a menu item selected from the second menu.

22 Claims, 12 Drawing Sheets

(56) References Cited

FOREIGN PATENT DOCUMENTS

| | | |
|---|---|---|
| JP | 2007-72840 | 3/2007 |
| KR | 10-2006-0014290 | 2/2006 |
| KR | 10-2007-0075815 | 7/2007 |

OTHER PUBLICATIONS

Koran Notice of Allowance dated Jan. 20, 2015 from Korean Patent Application No. 10-2007-0082400, 5 pages.

* cited by examiner

USER'S VIEWING DIRECTION

USER'S VIEWING DIRECTION

APPARATUS AND METHOD OF PROVIDING GRAPHICAL USER INTERFACE

CROSS REFERENCE TO RELATED APPLICATION

This application claims priority from Korean Patent Application No. 10-2007-0082400 filed on Aug. 16, 2007 in the Korean Intellectual Property Office, the disclosure of which is incorporated herein by reference in its entirety.

BACKGROUND OF THE INVENTION

1. Field of the Invention

The present invention relates to an apparatus and method of providing a graphical user interface, and, more particularly, to an apparatus and method of providing a graphical user interface that enables a user to rapidly search a desired menu.

2. Description of the Related Art

In general, an apparatus for providing content, such as moving pictures, music and images, provides a user with a graphical user interface to enable the user to rapidly search desired content.

The graphical user interface is provided in the form of a menu that enables the user to select desired content. The user uses a pointing device, such as a keypad, a keyboard, and a mouse, to move a pointer on a menu screen to select desired content.

The graphical user interfaces are mainly classified into two-dimensional graphical user interfaces and three-dimensional graphical user interfaces. The two-dimensional graphical user interface is two-dimensional and static, but the three-dimensional graphical user interface is three-dimensional and dynamic. Therefore, the three-dimensional graphical user interface can visually transmit information and satisfy user's sensitivity.

In the three-dimensional graphical user interface, the arrangement of a three-dimensional block varies according to the motion of a camera view, and one surface of the three-dimensional block having important information displayed thereon is directed in the camera view, thereby preventing unnecessary information from being transmitted to the user. However, in this structure, information is displayed on the surface of the three-dimensional block, which makes it difficult to display additional information on the three-dimensional block.

Japanese Unexamined Patent Application Publication No. 2004-246712 discloses a graphical user interface that spreads a submenu image when the user designates one of the images that three-dimensionally rotates. However, the above-mentioned problem remains unsolved.

SUMMARY OF THE INVENTION

An object of the invention is to provide an apparatus and method of providing a graphical user interface that displays menus on two surfaces of a three-dimensional block to enable a user to rapidly and conveniently acquire information, and provides menu image transition and a short path.

The present invention should not be construed as being limited to the above objects, and the above stated objects as well as other objects, features and advantages, of the present invention will become clear to those skilled in the art upon review of the following description.

According to one aspect of the invention, there is provided an apparatus for providing a graphical user interface, the apparatus including an output unit outputting a first menu in which a plurality of menu items are arranged in a predetermined direction, and outputting a second menu having a first region and a second region that are classified from a menu item selected from the first menu according to a predetermined classification standard, and a control unit performing an operation that corresponds to a menu item selected from the second menu.

According to another aspect of the invention, there is provided a method of providing a graphical user interface, the method including outputting a first menu in which a plurality of menu items are arranged in a predetermined direction, and outputting a second menu having a first region and a second region that are classified from a menu item selected from the first menu according to a predetermined classification standard, and performing an operation that corresponds to a menu item selected from the second menu.

BRIEF DESCRIPTION OF THE DRAWINGS

The above and other features and advantages of the present invention will become apparent by describing in detail preferred embodiments thereof with reference to the attached drawings in which.

DESCRIPTION OF THE PREFERRED EMBODIMENTS

Advantages and features of the present invention and methods of accomplishing the same may be understood more readily by reference to the following detailed description of the preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

Hereinafter, the present invention is described by referring to block diagrams and flow charts which explain the apparatus and the method to prevent data loss of a nonvolatile memory. Here, each block of the flow charts and combinations of the flow charts can be executed using computer program instructions. Since such computer program instructions can be loaded into a personal computer, a customized computer, and other processors of data processing devices which can be programmed, the instructions executed by a computer or a processor of a data processing device which can be programmed can serve as a means to execute the functionality described in the blocks of the flow charts. Such computer program instructions can be loaded into a computer to implement a function in a specific manner. Also such computer program instructions can be loaded on a memory that can be used or read by a computer or a computer that includes a programming data processing device.

The instructions stored in a memory that can be used or read by a computer can be used to produce a manufacturing product including the instructions that executes the functionality described in the flow blocks. Since computer program instructions can be loaded on a computer or other programmable data processing devices, instructions executed in a computer or other programmable data processing device can provide steps to execute functionalities described in the flow blocks.

Also, each block can represent a module, a segment, or a part of code that includes more than one instruction that executes a specific logic functions. Note that in some examples of alternative executions functions mentioned in blocks can be executed out of order. That is, adjacent two blocks can be executed in parallel, or they can be executed in reverse order depending on the functionality of each of the blocks.

Figure 1:
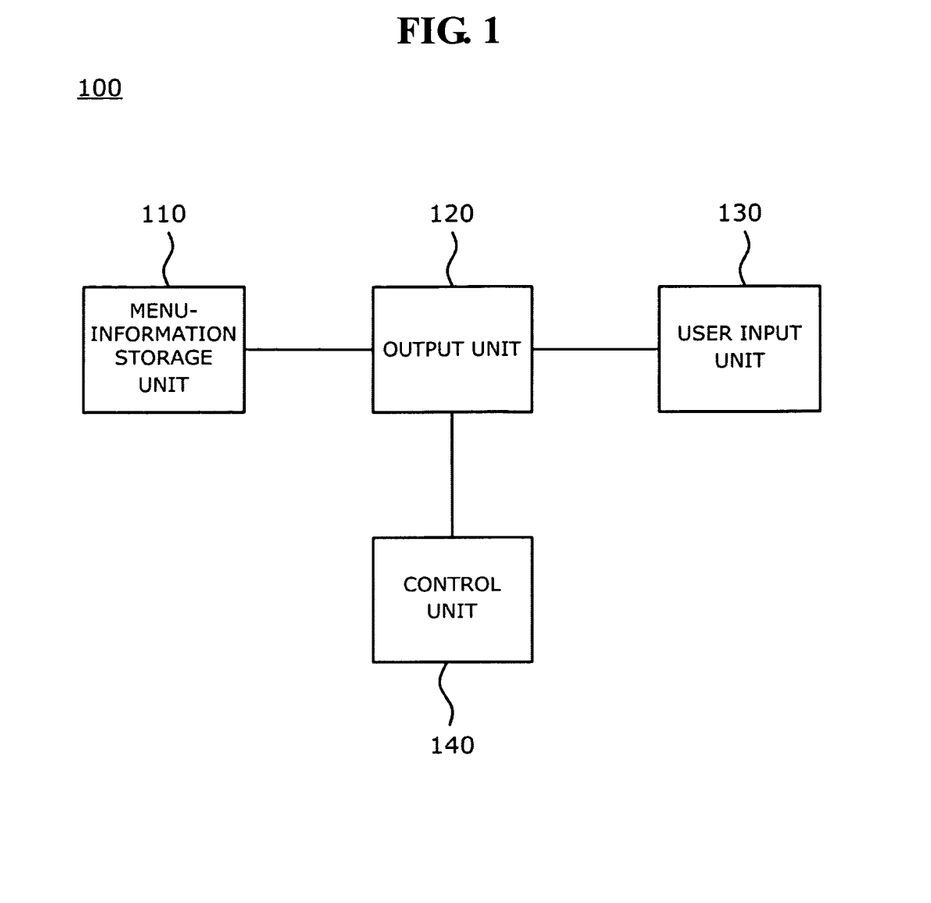
FIG. 1 is a block diagram illustrating the structure of a graphical-user-interface-providing apparatus according to an embodiment of the invention.

FIG. 1 is a block diagram illustrating the structure of a graphical-user-interface-providing apparatus according to an embodiment of the invention.

As shown in FIG. 1, a graphical-user-interface-providing apparatus 100 according to an embodiment of the invention includes a menu-information storage unit 110, an output unit 120, a user input unit 130, and a control unit 140. The graphical-user-interface-providing apparatus 100 according to the embodiment of the invention may be connected to a multimedia apparatus from which a user can receive content, such as moving pictures, music, and text through a wire or wireless interface or it may be integrated with the wire or wireless interface. However, the invention is not limited thereto.

The menu-information storage unit 110 may store classification information for classifying a plurality of menu items corresponding to a plurality of content according to a predetermined standard for classification. Specifically, the menu-information storage unit 110 may store classification information for classifying submenu items of a main menu item according to a predetermined classification standard. For example, the main menu item is 'movie', and the sub items include 'comedy movie', 'action movie', and 'sports movie'. When the classification standard is 'country', each of the menu items 'comedy movie', 'action movie', and 'sports movie' may be classified into 'domestic' and 'foreign' items. That is, the menu items 'comedy movie', 'action movie', and 'sports movie' may be classified into a 'domestic comedy movie', a 'domestic action movie' and a 'domestic sports movie', and a 'foreign comedy movie', a 'foreign action movie' and a 'foreign sports movie', respectively, and the menu-information storage unit 110 may store these classification information items.

The output unit 120 may output a first menu in which a plurality of menu items are arranged in a predetermined direction, and a second menu in which menu items corresponding to input values that are input by a user through the user input unit 130 are divided into a first region and a second region according to a predetermined classification standard. Each of the first region and the second region may include at least one menu item. For example, as described above, when the user selects a menu item 'movie' in the first menu, the output unit 120 outputs a second menu that has the first region including the menu items 'domestic comedy movie', 'domestic action movie', and 'domestic sports movie', and the second region including the menu items 'foreign comedy movie', 'foreign action movie', and 'foreign sports movie'.

The direction in which the menu items included in the first and second menus are output depends on the structure of a screen. The user input unit 130 means a user-operable apparatus such as a remote controller.

The priorities of the menu items included in the first and second regions increase as the menu items become close to the boundary between the first region and the second region. That is, it will be understood that the menu items included in the first and second regions are closely related to the menu items selected from the first menu. For example, when the menu item 'movie' is selected from the first menu, the menu item may include the submenu items 'domestic movie' and 'movie music'. However, since the menu item 'movie' is more closely related to the submenu item 'domestic movie' than to the submenu item 'movie music', the submenu item 'domestic movie' is positioned closer to the boundary between the first region and the second region. The priority may be predetermined or designated by the user, but the invention is not limited thereto.

When the user selects a menu item from the first menu by using the user input unit 130, the output unit 120 may output the second menu instead of the first menu. Since the size of the screen required for the output unit 120 to output the first menu or the second menu corresponds to the first menu or the second menu, the area of the menu on the screen is reduced. Since the area of the first menu or the second menu on the screen is reduced, the graphical user interface can be used for a portable apparatus having a small screen.

The first and second regions of the second menu output from the output unit 120 can be determined according to the classification standard that is used to store the classification information for each menu item in the menu-information storage unit 110. In the present embodiment of the invention, the first menu and second menu are used for explanatory convenience, but the invention is not limited thereto. When the user selects a desired menu item from the second menu using the user input unit 130, the output unit 120 may output a menu in the form of the second menu. That is, a third menu, a fourth menu, . . . , an n-th menu may be output, similar to the relationship between the first menu and the second menu. In addition, all or some of the first menu, the second menu, the third menu, the fourth menu, . . . , the n-th menu may include the first region and the second region.

As described above, when the menu items are classified from the main menu to the submenus and are then provided to the user, the user can rapidly search desired content without searching all of the menu items, and the number of menu items to be searched according to the classification standard can be reduced. For example, when the number of menu items searched by the user from the first menu to the n-th menu is N in a general menu structure, the number of menus searched by the user is log 2N in a menu structure according to this embodiment of the invention.

In the present embodiment of the invention, the second menu is classified into the first region and the second region that include the submenu items of the menu item selected from the first menu that are classified according to a predetermined classification standard, but the invention is not limited thereto. The first and second regions of the second menu may be used to determine whether to use the menu item selected from the first menu. For example, the first region may include a menu item 'Yes' indicating that the menu item selected from the first menu is used, and the second region may include a menu item 'No' indicating that the menu item selected from the first menu is not used. This may be applied to a case in which the user selects a predetermined menu item from the second menu.

When the first menu includes menu items 'movie', 'music' and 'drama' and the user selects the menu item 'movie' and selects the menu item 'Yes' from the second menu, the output unit 120 may output the second menu including menu items of 'movie' content among various content.

The output unit 120 displays the boundary between two menu items in the first region and the second region such that the boundary seems to protrude toward the user from the screen, which makes it possible for the user to feel that two surfaces of a three-dimensional block are displayed on the screen. In addition, when the user moves the menu in order to select a desired menu item, the output unit 120 may display three-dimensional block such that the block seems to rotate in the direction in which the menu items are arranged.

The control unit 140 may perform an operation corresponding to the menu item that is selected by the user through the user input unit 110. For example, when the user selects the menu item 'movie', the control unit 110 reproduces the movie. When the user selects a function, the control unit 110 may perform the selected function. The term 'function' may include various functions of a multi-media apparatus as well as a function of reproducing content, such as moving pictures and music.

Figure 2:
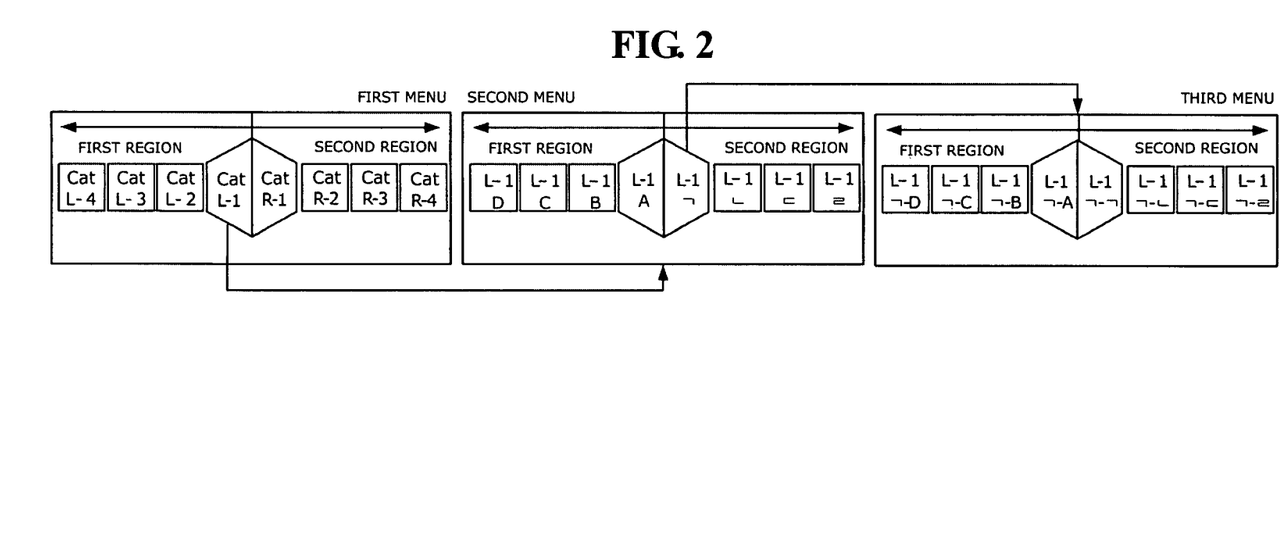
FIGS. 2 and 3 are diagrams illustrating the graphical user interface according to the embodiment of the invention.

FIG. 2 is a diagram illustrating a process of searching for a menu item according to an embodiment of the invention.

As shown in FIG. 2, when the user selects a menu item 'Cat L-1' from the first menu, the second menu having the first region including 'L-1 A', . . . , 'L-1 D' and the second region including 'L-1 ⁄ ⁎, . . . , 'L-1 ㄹ', which are submenu items of the menu item 'Cat L-1' may be output. The third menu may be output in the same manner as described above. In this case, it will be understood that the second menu is classified into the first region including the menu items 'L-1 A', . . . , 'L-1 D' and the second region including the menu items 'L-1 ⁄ ⁎, . . . , 'L-1 ㄹ', since the menu item 'Cat L-1' selected from the first menu is classified according to a predetermined classification standard. FIG. 2 shows all of the menus that are output, in order to show a variation in each menu. However, any one of the first to third menus can be output.

Figure 3:
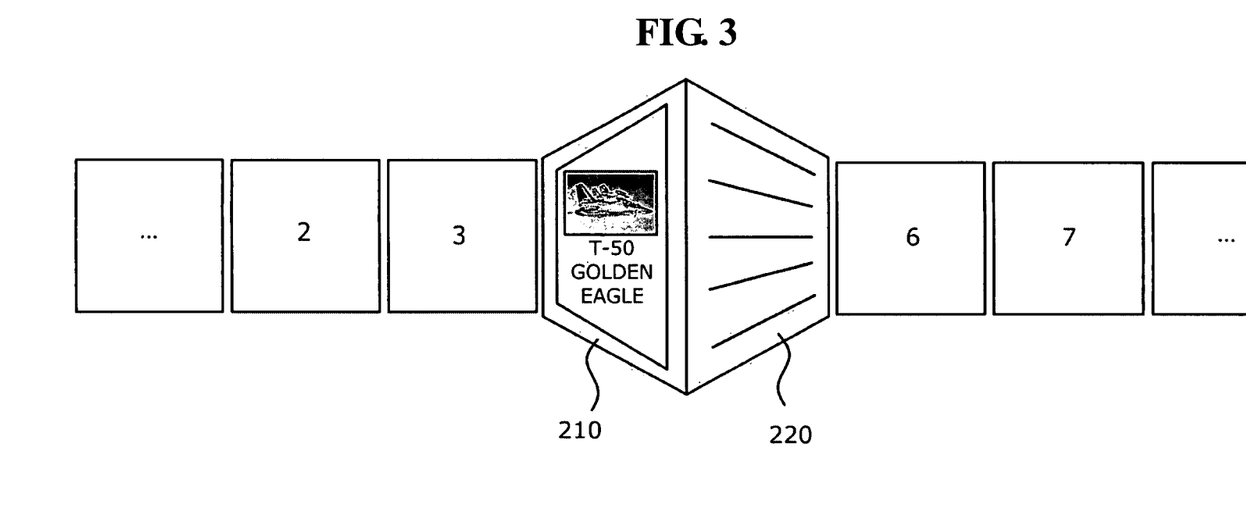

In FIG. 2, the first and second menus show all menu items included therein, but the invention is not limited thereto. For example, as shown in FIG. 3, the first region of the second menu may show only an image and text 210, and the second region may show only text 220. The example shown in FIG. 3 is illustrative for better comprehension of the invention, but the invention is not limited thereto. The image and text displayed in each of the menu items included in the first and second regions may depend on the type of apparatus provided with the graphical-user-interface-providing apparatus 100.

Figure 4:
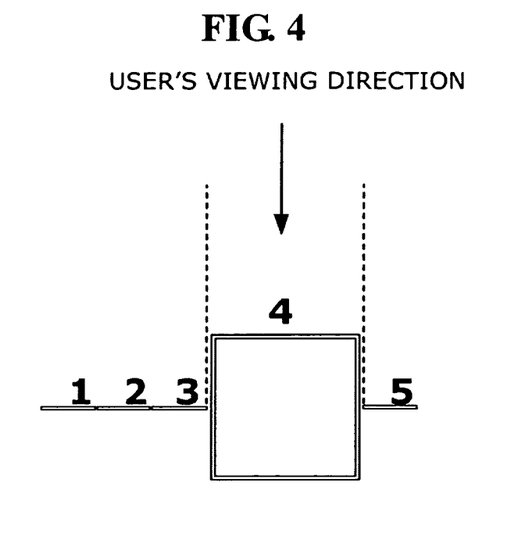
FIGS. 4 to 7 are diagrams illustrating the transition of a menu item in the graphical user interface according to the embodiment of the invention.
Figure 5:
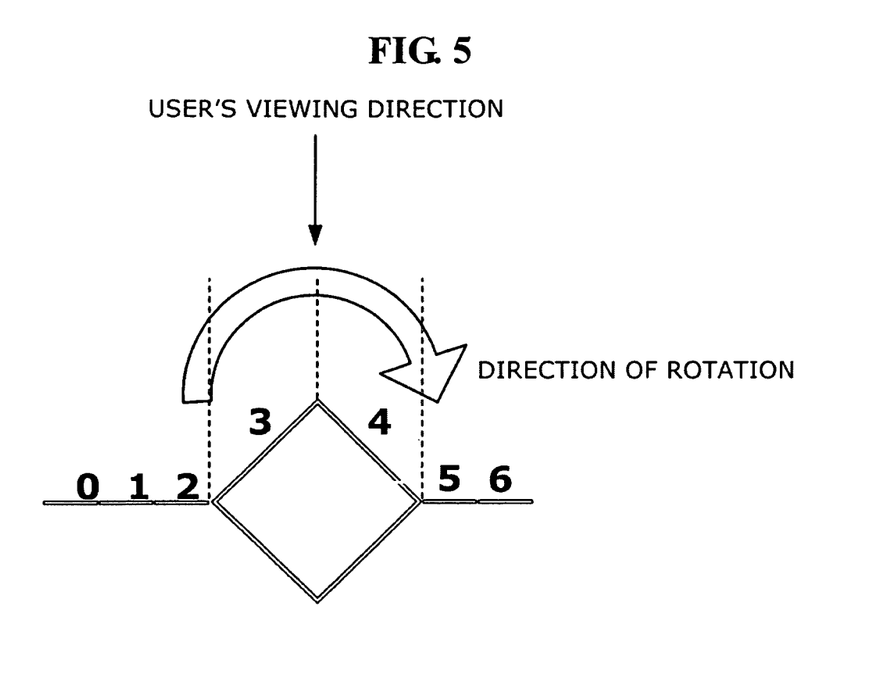

FIGS. 4 and 5 are diagrams illustrating an example of the movement of a three-dimensional block according to an embodiment of the invention. It will be understood that FIGS. 4 and 5 show the side of the first menu or the second menu.

As shown in FIG. 4, first, the user views one surface of the three-dimensional block. However, when the user moves the menu item, as shown in FIG. 5, the three-dimensional block is moved such that the user views two surfaces. In this case, as shown in FIG. 5, the three-dimensional block is displayed such that the viewing angles of the two surfaces viewed by the user are smaller than that of the surface of the three-dimensional block shown in FIG. 4, which makes it possible for the user to view other menus that are not shown in FIG. 4. For example, when the user views two surfaces of the three-dimensional block, the user can see menu item No. '6' that is not viewed by the user when the user sees only one surface of the three-dimensional block.

FIGS. 4 and 5 show the rotation of the three-dimensional block in the clockwise direction, but the invention is not limited thereto. The three-dimensional block may rotate in a counterclockwise direction. In this case, the same method as described above may be applied to the rotation of the three-dimensional block in the counterclockwise direction.

Figure 6:
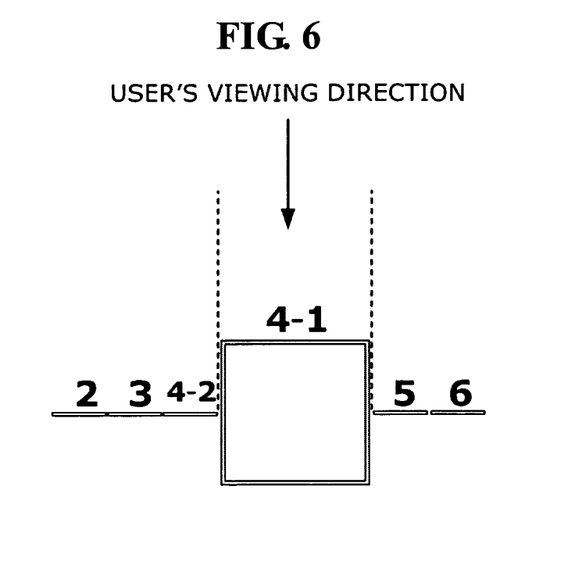
Figure 7:
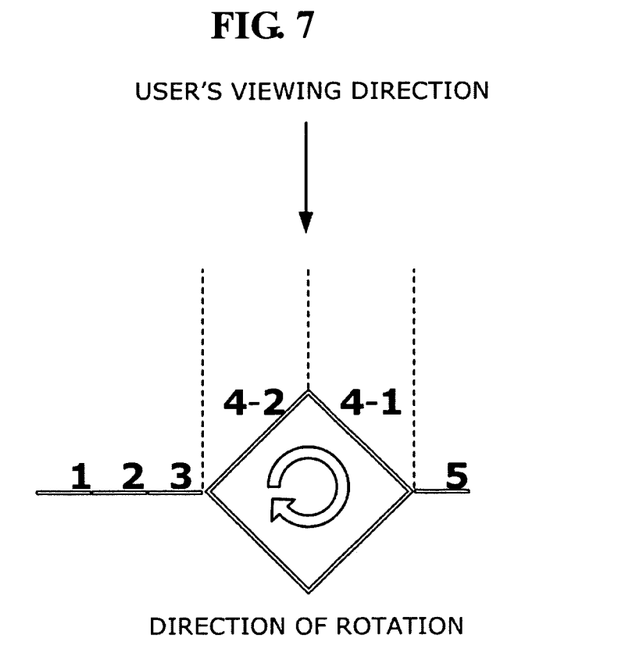

As shown in FIGS. 4 and 5, only one menu item is displayed on one surface of the three-dimensional block, but the invention is not limited thereto. For example, as shown in FIGS. 6 and 7, two items of the menu item selected by the user from the first menu, for example, 'Yes' and 'No' may be output. FIG. 6 shows one of the two items, and FIG. 7 shows the two items.

Figure 8:
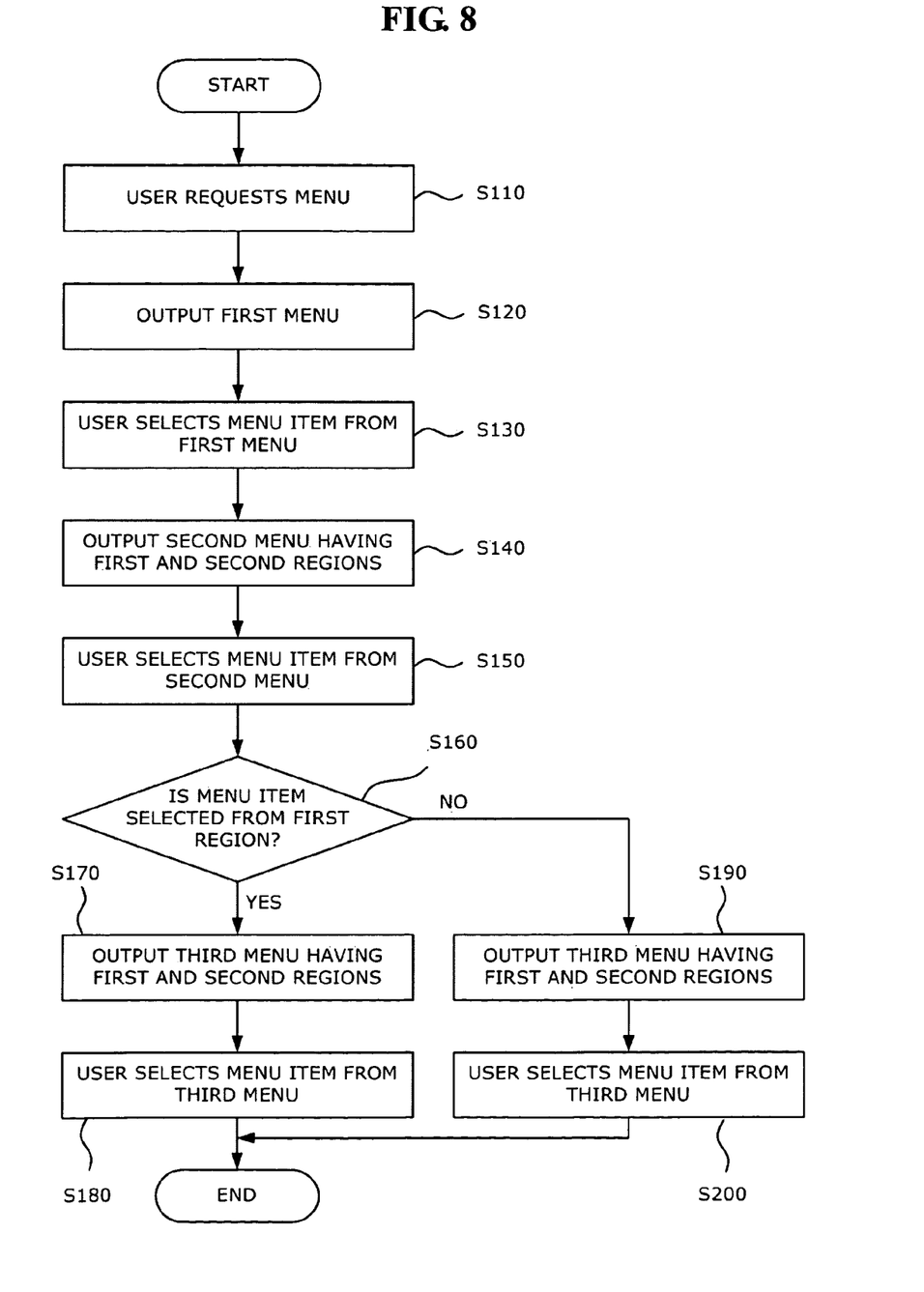
FIG. 8 is a flowchart illustrating a method of providing a graphical user interface according to another embodiment of the invention.

FIG. 8 is a flowchart illustrating a method of providing a graphical user interface according to an embodiment of the invention. In the flowchart shown in FIG. 8, it is assumed that a first menu includes a second menu, which is a submenu, and the second menu includes a third menu, which is a submenu.

As shown in FIG. 8, in the method of providing the graphical user interface according to the embodiment of the invention, first, the user calls out a menu in order to search content S110. The user can call out the menu using the user input unit 110, or wire or wireless communication.

When the user calls out the menu, the output unit 120 outputs the first menu S120, and then the user selects a desired menu item from the output first menu S130.

When the user selects a desired menu item from the first menu, the output unit 120 output the second menu that is classified into the first region and the second region S140, and then the user selects a menu item from one of the first and second region of the second menu S150.

When the user selects a menu item from the first region of the second menu S160, the output unit 120 outputs the third menu having the first region and the second region from the menu item selected from the second menu S170.

The user selects a desired menu item from the output third menu S180.

If the user selects a menu item from the second region of the second menu in Step S150, the output unit 120 outputs the third menu having the first region and the second region from the menu item selected from the second menu S190, and then the user selects a desired menu item from the third menu S200.

The third menu output in Steps S160 and S180 may include the first region and the second region that are classified from each of the first region and the second region of the second menu according to a classification standard. That is, when the first region of the second menu corresponds to a domestic movie and the second region of the second menu corresponds to a foreign movie, the first region and the second region of the third menu belonging to the first region of the second menu that corresponds to the domestic movie in Step S160 correspond to a comedy movie and a sports movie, respectively. The first region and the second region of the third menu belonging to the second region of the second menu that corresponds to the foreign movie in Step S180 correspond to a comedy movie and a sports movie, respectively.

In the present embodiment of the invention, the first region and the second region of the second menu are classified from the menu item selected from the first menu according to a predetermined classification standard and are then output, but the invention is not limited thereto. The relationship between the second menu and the third menu may be identical with the relationship between the first menu and the second menu.

Figure 9:
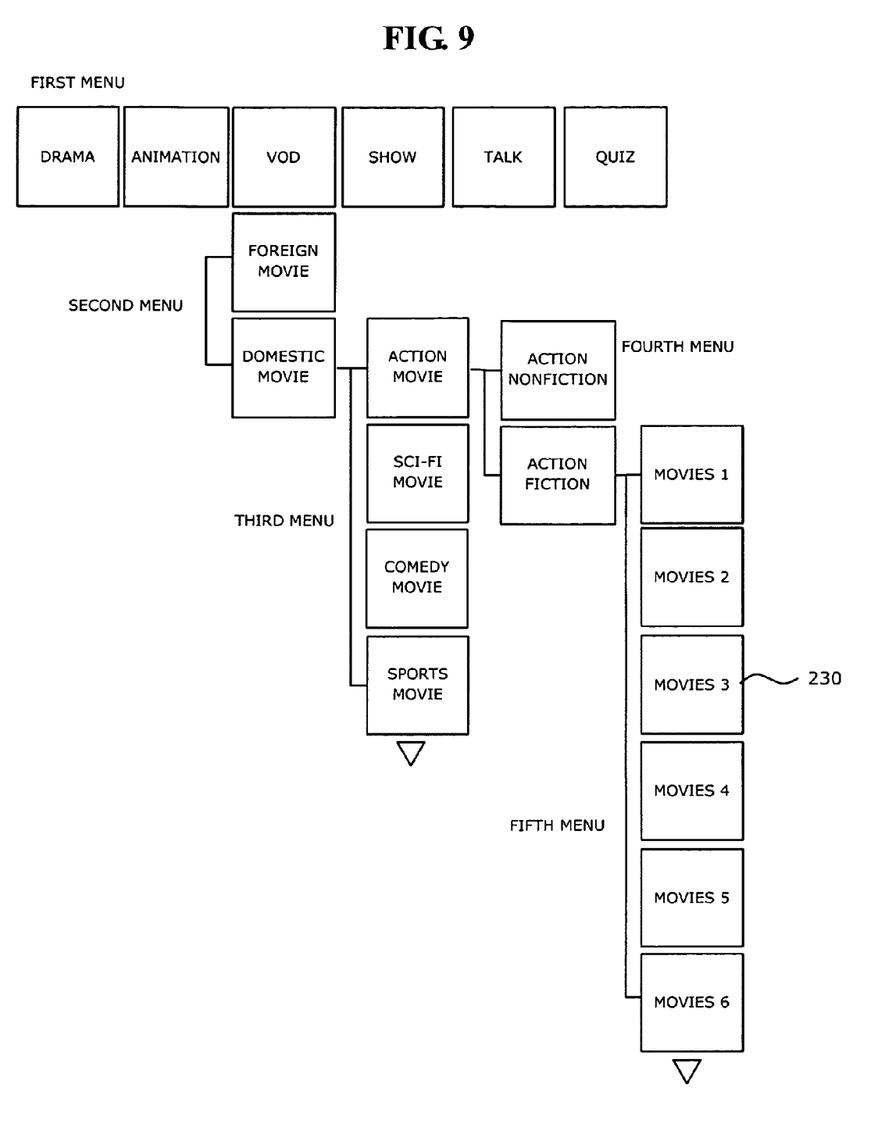
FIGS. 9 to 12 are diagrams illustrating processes of searching a menu item using a general graphical user interface and the graphical user interface according to the embodiment of the invention.
Figure 10:
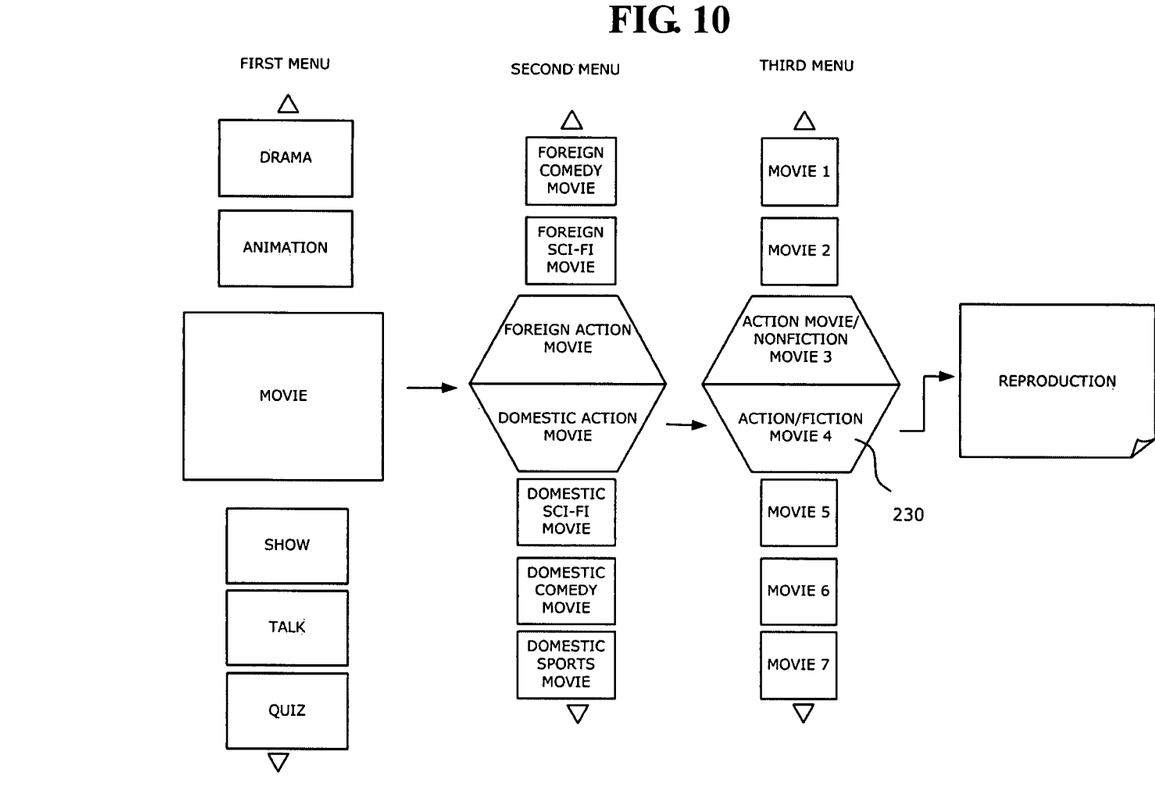
Figure 11:
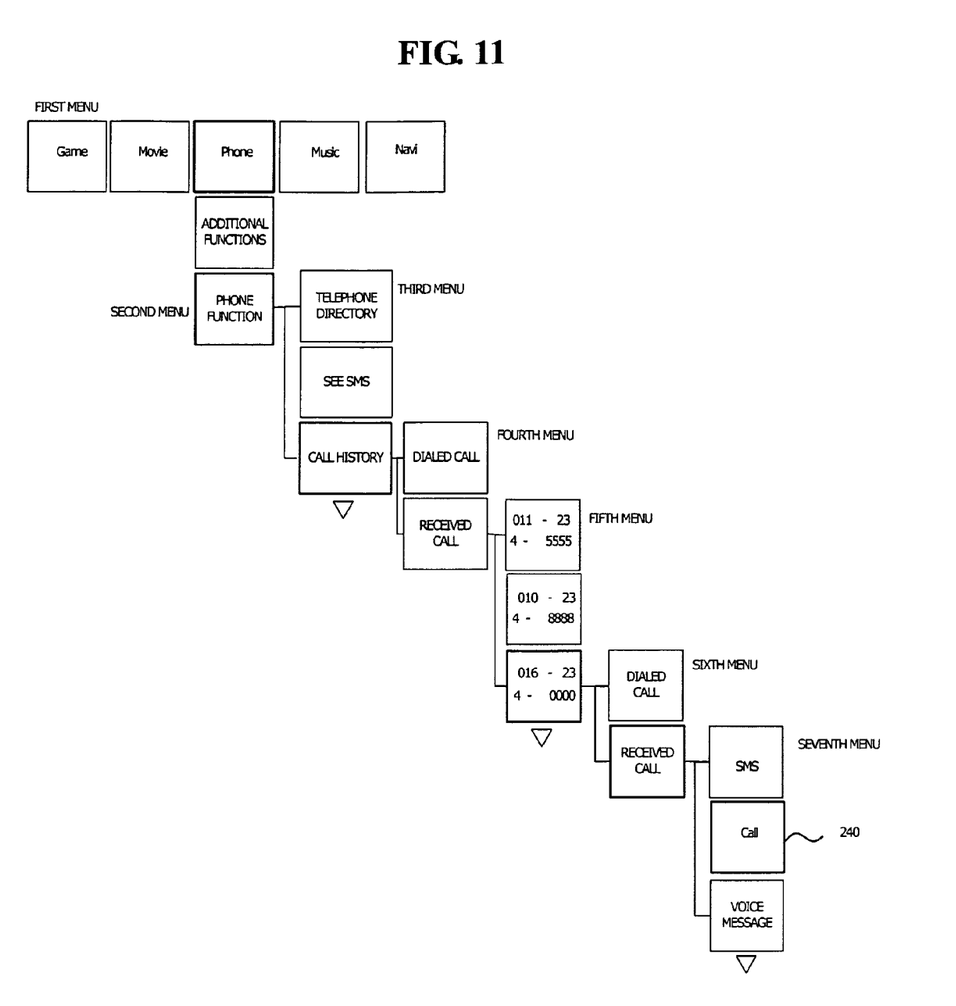
Figure 12:
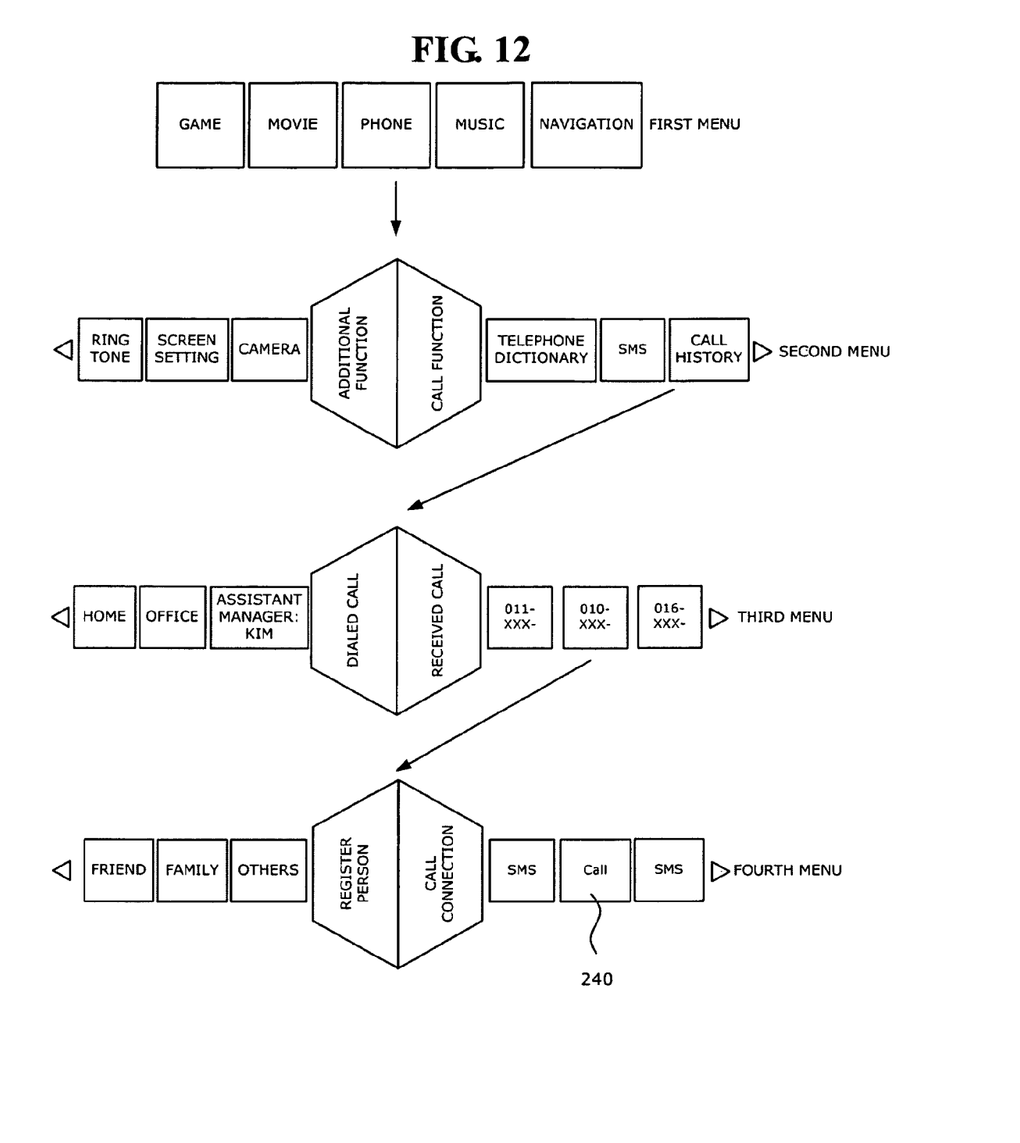

FIGS. 9 and 11 are diagrams illustrating a process of searching for a menu item using a general graphical user interface, and FIGS. 10 and 12 are diagrams illustrating a process of searching a menu item using the graphical user interface according to an embodiment of the invention.

As shown in FIG. 9, when the general graphical user interface is used to reproduce a movie 3 (230), a menu item is searched for from the first menu to the fifth menu, and the searched menu item is reproduced. However, in the graphical user interface according to the embodiment of the invention, as shown in FIG. 10, a menu item is searched from the first menu to the third menu, and then the searched menu item is reproduced.

As shown in FIG. 11, in the general graphical user interface, when the user searches a telephone number from a received call list to make a call, the user searches a menu item 'Call' (240) from the first menu to the seventh menu. However, in the graphical user interface according to the embodiment of the invention, as shown in FIG. 12, the user searches the menu item 'Call' from the first menu to the fourth menu to make a call.

Therefore, the graphical user interface according to the embodiment of the invention makes it possible to shorten search time and reduce the number of menu items to be searched, as compared to the general graphical user interface. As a result, the user can rapidly search content.

The terminology "unit" used in the exemplary embodiments of the present invention represents a hardware component including a Field Programmable Gate Array (FPGA) and an Application Specific Integrated Circuit (ASIC) and executes particular operations. However, the terminology "unit" is not limitative to hardware or software. The unit can be constructed to be stored into addressable storage device or can be constructed to execute one or more processors. For example, the unit can include software components, object oriented software components, class components, and task components. The unit also can include processes, functions, attributes, procedures, subroutines, segments of program codes, drivers, firmware, microcode, circuit, data, database, data structures, tables, arrays, and variables. Functions provided by components and units can be combined into smaller number of components and units or can be further divided into additional components and units.

While the present invention has been particularly shown and described with reference to exemplary embodiments thereof, it will be apparent to those skilled in the art that the scope of the invention is given by the appended claims, rather than the preceding description, and all variations and equivalents which fall within the range of the claims are intended to be embraced therein. Therefore, it should be understood that the above embodiments are not limitative, but illustrative in all aspects.

What is claimed is:

1. An apparatus for providing a graphical user interface, comprising:
    a computer comprising:
    an output unit to output on a display a first menu comprising a first region of items, a second region of items, and a first category region comprising a first category and a second category, and to output on the display a second menu comprising a third region of items, a fourth region of items, and a second category region comprising a third category and a fourth category, according to a selected item from one of the first region of items and the second region of items of the first menu,
    wherein the first region and the second region are arranged in opposite directions,
    wherein the items in the first region correspond to the first category, and the items in the second region correspond to the second category,
    wherein the first category and second category are arranged in the same and opposite directions as the first region and the second region, respectively, and
    wherein when the selected item from one of the first region of items and the second region of items of the first menu is selected, the output unit outputs the second menu on the display to replace the first menu with the second menu such that the first region of items is replaced by the third region of items, the second region of items is replaced by the fourth region of items, and the first category region is replaced by the second category region.

2. The apparatus of claim 1, wherein:
    in the second menu, submenu items of the item selected from the first menu are classified according to a classification standard whose level is lower than that of the item selected from the first menu; and
    the submenu items are included in each of the third region and the fourth region of the second menu according to the lower-level classification standard.

3. The apparatus of claim 1, wherein the items included in the third region and the fourth region of the second menu are displayed in different forms.

4. The apparatus of claim 1, wherein the items included in the first menu and the items included in the second menu are arranged in the same direction.

5. The apparatus of claim 1, wherein, in the second menu, the priorities of the items included in the third region and the fourth region increase as the items become close to the boundary between the third region and the fourth region.

6. The apparatus of claim 5, wherein the priorities are predetermined or designated by a user.

7. The apparatus of claim 1, wherein the items included in the first menu are arranged in a predetermined direction.

8. The apparatus of claim 1, wherein the third region and fourth region are classified from the item selected from the first menu according to a predetermined classification standard.

9. The apparatus of claim 1, further comprising a controller to perform an operation that corresponds to an item selected from the second menu.

10. The apparatus of claim 1, wherein a boundary between adjacent items in each of the third region and the fourth region of the second menu is displayed such that it seems to protrude from a screen.

11. The apparatus of claim 10, the adjacent items are displayed on two surfaces of a three-dimensional block which rotates in a direction in which items in each of the third region and the fourth region of the second menu are arranged, when a user moves the menu in order to select a desired item, while the remaining items in each of the third region and the fourth region of the second menu are displayed adjacent to the three-dimensional block.

12. A method of providing a graphical user interface, comprising:
    outputting on a display a first menu comprising a first region of items, a second region of items, and a first category region comprising a first category and a second category;
    receiving a selected item from one of the first region of items and the second region of items of the first menu; and
    outputting on the display a second menu comprising a third region of items, a fourth region of items, and a second category region comprising a third category and a fourth category, according to the selected item from one of the first region of items and the second region of items of the first menu, wherein the first region and the second region are arranged in opposite directions, wherein the items in the first region correspond to the first category, and the items in the second region correspond to the second category, wherein the first category and second category are arranged in the same and opposite directions as the first region and the second region, respectively, wherein when the receiving of the selected item from one of the first region of items and the second region of items of the first menu is performed, the outputting of the second menu on the display comprises replacing the first menu with the second menu such that the first region of items is replaced by the third region of items, the second region of items is replaced by the fourth region of items, and the first category region is replaced by the second category region.

13. The method of claim 12, wherein:

in the second menu, submenu items of the item selected from the first menu are classified according to a classification standard whose level is lower than that of the item selected from the first menu; and the submenu items are included in each of the third region and the fourth region of the second menu according to the lower-level classification standard.

14. The method of claim 12, wherein the items included in the third region and the fourth region of the second menu are displayed in different forms.

15. The method of claim 12, wherein the items included in the first menu and the items included in the second menu are arranged in the same direction.

16. The method of claim 12, wherein, in the second menu, the priorities of the items included in the third region and the fourth region increase as the items become close to the boundary between the third region and the fourth region.

17. The method of claim 16, wherein the priorities are predetermined, or are designated by a user.

18. The method of claim 12, wherein the items included in the first menu are arranged in a predetermined direction.

19. The method of claim 12, wherein the third region and fourth region are classified from the item selected from the first menu according to a predetermined classification standard.

20. The method of claim 12, further comprising performing an operation that corresponds to an item selected from the second menu.

21. The method of claim 12, wherein the third and fourth categories are adjacent to one another, and a boundary between the third and fourth categories is displayed such that it seems to protrude from a screen.

22. The method of claim 21, wherein the third and fourth categories are displayed on two surfaces of a three-dimensional block which rotates in a direction in which the third and fourth categories are arranged when a user moves the three-dimensional block in order to select a desired category, while the third region of items and fourth region of items are displayed adjacent to the three-dimensional block.

* * * * *